Nov. 30, 1954 K. BURG 2,695,776
APPARATUS FOR INDICATING ACCELERATION AND DECELERATION
Filed Jan. 29, 1953
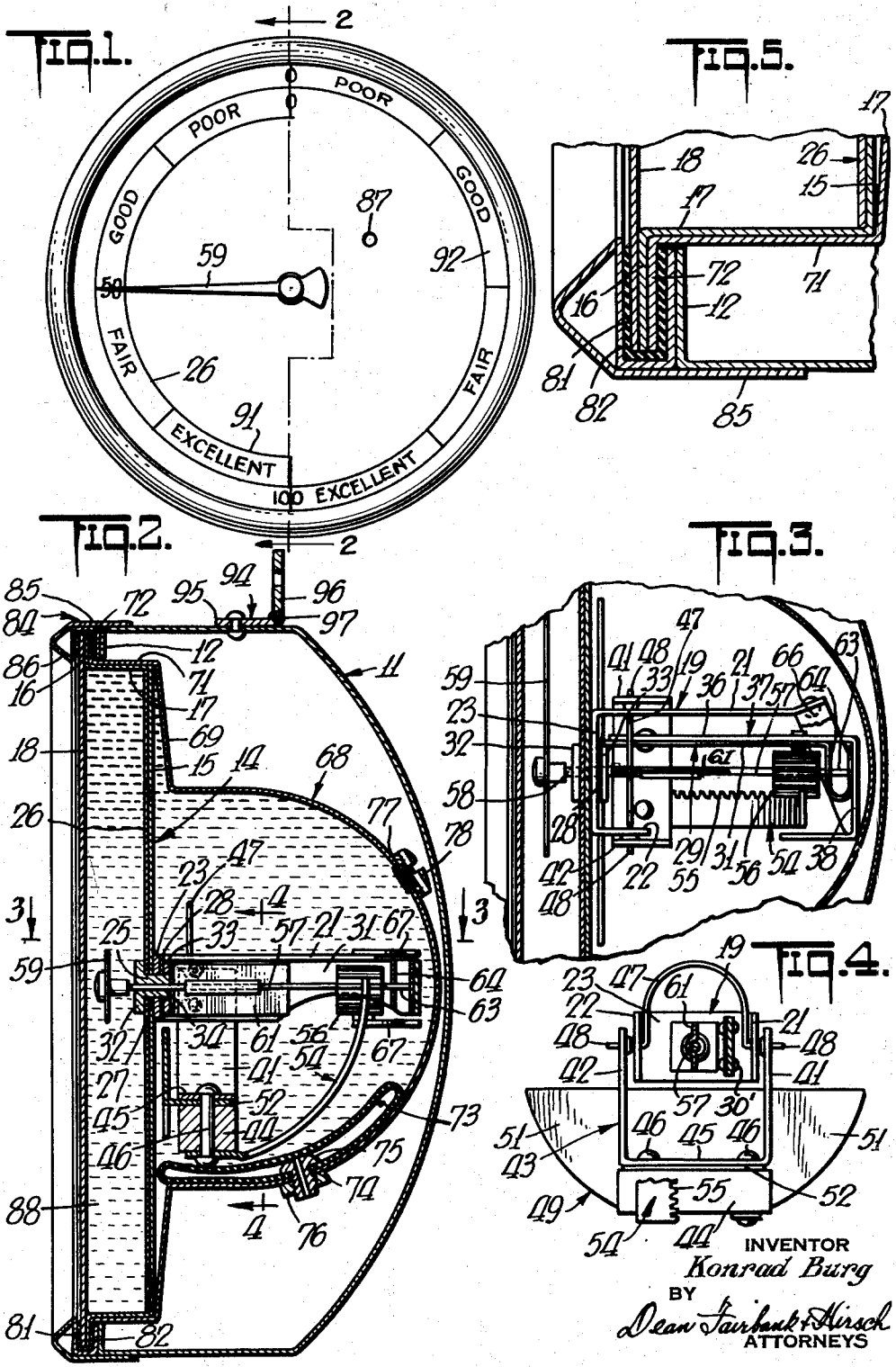
INVENTOR
*Konrad Burg*
BY
*Dean Fairbank & Hirsch*
ATTORNEYS

United States Patent Office 2,695,776
Patented Nov. 30, 1954

2,695,776

APPARATUS FOR INDICATING ACCELERATION AND DECELERATION

Konrad Burg, Vienna, Austria, assignor to Albert P. Kantor, Havana, Cuba

Application January 29, 1953, Serial No. 333,960

9 Claims. (Cl. 264—1)

This invention relates to vehicle performance meters, more particularly of the dynamic type which are actuated by the movement of the vehicle.

For the driver of a vehicle, such as an automobile, to determine the efficiency of performance thereof with respect to acceleration or braking, for example, the automobile must generally be turned over to a service station for this purpose. As the acceleration and braking characteristics of an automobile are important features to be known for safe driving, unless the driver has his vehicle tested periodically, he would have no way of knowing just when the above characteristics of his automobile had reached a point of unsafety.

It is accordingly among the objects of the invention to provide a vehicle performance meter that is small, compact, having but few parts, not likely to be deranged even with long use, that may be readily manufactured at low cost without requirement of a high degree of precision and tolerance and which may readily be mounted in the automobile in view of the driver without in any way interfering with his vision and which will, without any special skill other than normal driving ability, provide relatively accurate indications of the performance of such vehicle including, but not limited to, its acceleration and braking characteristics, all without any external connections to the vehicle except for the mount thereto.

According to the invention, these objects are accomplished by the arrangement and combination of elements hereinafter described and particularly recited in the claims.

In the accompanying drawing in which is shown one or more of various possible embodiments of the several features of the invention, Fig. 1 is a front elevational view of the device,
Fig. 2 is a transverse sectional view taken along lines 2—2 of Fig. 1,
Fig. 3 is a transverse sectional detailed view taken along line 3—3 of Fig. 2,
Fig. 4 is a longitudinal detailed sectional view taken along line 4—4 of Fig. 2, and
Fig. 5 is a fragmentary detail view on a larger scale of clamped rim of the device.

Referring now to the drawing, the device desirably comprises a hollow case 11 which may have an internal annular flange 12 at its mouth. Positioned in the mouth of the case is a substantially cup-shaped member 14 with a circular flat wall or floor 15 and an outwardly extending annular flange 16 at the rim of its wall 17, a transparent disc 18 preferably of plastic, resting on said flange 16.

Affixed to the inner surface of floor 15 adjacent its center, is a substantially U-shaped bracket 19, having a pair of parallel legs 21 and 22 extending outwardly at right angles to floor 15 from the ends of the cross piece 23 of the bracket 19.

Although the bracket may be affixed to floor 15 in any suitable manner, in the embodiment herein, a hollow rivet 25 extends through a dial face 26 substantially the same area as floor 15 and positioned against the outer surface thereof; through an opening 27 in the center of said floor 15, through cross piece 23 of bracket 19 and through the leg 28 of a substantially L-shaped resilient member 29, the other leg 31 of which extends parallel to leg 21 of bracket 19. The flat head 32 of rivet 25 rests against dial face 26 and the inner end of the rivet 25 which extends through a washer 33, is flared outwardly as at 34 to clamp the dial face, the bracket, the resilient member and the washer securely to floor 15. With this construction the dial face is retained against the outer surface of floor 15 and the bracket 19 is retained against its inner surface. Affixed as by riveting as at 30' to the leg 31 of resilient member 29 is the leg 36 of a substantially L-shaped supporting member 37, said leg 36 extending parallel to leg 21 of bracket 19 with the leg 38 of supporting member 37 being spaced from cross piece 23 of bracket 19 and extending parallel thereto.

Pivotally mounted to the legs 21 and 22 of bracket 19 are the ends of the legs 41, 42 of a U-shaped pendulum 43 which has a weight 44 affixed to the cross piece 45 thereof as by rivets 46. Although the legs 41, 42 may be connected in any suitable manner to legs 21 and 22, in the embodiment herein shown, legs 41 and 42 straddle legs 21 and 22 and a resilient reversely bent spring member 47 has its laterally extending legs 48 extending through aligned openings in associated legs 21, 41 and 22, 42 respectively.

A baffle plate 49 having lateral wings 51 has an inturned flange 52 which is clamped between the cross piece 45 and the weight 44 as by the rivets 46. Affixed to the weight as by one of the rivets 46 is one end of an arcuate rack 54 which, as shown in Fig. 2, when the legs of the pendulum are in vertical position rises upwardly.

The rack 54 has teeth 55 along one edge thereof which engage a pinion 56 affixed near one end of a shaft 57, the other end 58 of which extends through hollow rivet 25, which serves as a bearing, beyond the dial face 26 and has a pointer 59 affixed thereon. The shaft has affixed thereto between pinion 56 and rivet 25 a substantially rectangular baffle plate 61, to rotate with said shaft.

The free end 63 of shaft 57 adjacent pinion 56 extends through an opening in leg 64 formed by reversely bending the free end of the resilient member 29, said opening also serving as a bearing for the shaft. Desirably the leg 21 of bracket 19 is longer than leg 22 thereof and has a yoke 66 affixed to the free end thereof, the legs 67 of which straddle leg 38 of supporting member 37 to prevent excessive displacement thereof.

Associated with the cup-shaped member 14 is a substantially hemispherical container 68 of diameter less than that of the floor 15 of the cup-shaped member. The container 68 has an outwardly extending annular flange 69 at the mouth thereof with an annular wall 71 of internal diameter slightly greater than the diameter of wall 17 of the cup-shaped member so that the latter may fit therein. Wall 71 has an outwardly extending annular flange 72 against which the flange 16 of the cup-shaped member may rest.

Suitable means are desirably provided to clamp the transparent disc 18 to the flange 16 of the cup-shaped member 14; also to clamp the flange 72 of the container 68 to flange 16, and to provide a liquid tight seal at such clamped portion.

To this end an annular gasket 81 preferably of natural or synthetic rubber is positioned so as to encompass the rim of transparent disc 18 and the rims of flanges 16 and 72 as is clearly shown in Fig. 2. To protect the gasket, a pair of arcuate channels 82 are provided which encompass the gasket 81, the rim of disc 18 and the rims of flanges 16 and 72, said two channel members forming substantially a circular rim therearound. Means are desirably provided securely to retain the container 68 with the cup-shaped member 14 and transparent disc 18 affixed thereto in the case 11. To this end a circular retaining member 84 is provided having a wall 85 just slightly greater than the outer diameter of the case 11 so that when forced thereon it will be securely retained in place. The wall 85 desirably has a reversely bent portion 86 at its outer edge which clamps the channel members 82 against the flange 12 of the case 11 thereby preventing outward displacement of the component parts therein.

The container 68 desirably has a bladder 73 therein of resilient deformable material with an inlet 74 in which a headed hollow screw 75 is positioned which extends through the wall of the container, a nut 76 clamping the bladder and screw thereagainst.

The bladder is of sufficient rigidity so that its interior will define a cavity. Consequently, in the event the liquid in the container should expand, the bladder will be compressed thereby relieving the wall of the container of stress which might cause cracking thereof and leakage of liquid with subsequent inoperativeness of the device.

The container 68 prior to installation into the case 11 is charged with a suitable fluid such as oil through a port 77, the oil passing through opening 87 to fill the space 88 between the inner surface of transparent disc 18 and dial face 26. The port 77 is then sealed by threaded plug 78.

Although the dial face 26 may be calibrated in any suitable manner, in the illustrative embodiment herein shown, there are a plurality of concentric annular rows 91 and 92, for example, referring to acceleration and braking respectively. The row 91 referring to acceleration is calibrated from "0" to "100" illustratively over 180 degrees of arc in a counterclockwise direction and the row 92 referring to deceleration or braking is also calibrated from "0" to "100" through 180 degrees of arc, but in a clockwise direction.

The device is mounted say on the dashboard of the automobile by suitable means such as a hinge 94 having one leg 95 affixed to the top of the case as by riveting and another leg 96 affixed as by screws (not shown) to the dashboard. The device is desirably designed so that when it is tilted forwardly the pendulum will have pivoted substantially 45 degrees away from wall 15 and the pointer will indicate "0." The device will remain set in position by reason of the tight fit of pintle 97 between legs 95 and 96 of the hinge 94.

By reason of the resistance offered by the oil against the baffle plates 49 and 61, the movement of the pendulum and hence of the pointer will be impeded. The areas of the baffle plates are calibrated so that an acceleration or pickup equal to one "G," i. e., 32 feet per second per second will cause the pendulum to swing rearwardly sufficient to rotate the shaft and pointer thereon in a counterclockwise direction to "100" on the row 91 of the dial. The area adjacent this number is marked "Excellent" and preceding areas are marked "Fair," "Good" and "Poor," for example.

If, at a given speed, pressure is suddenly applied with force to the brake pedal, the vehicle will decelerate and consequently the pendulum will swing forwardly rotating the pointer in a clockwise direction; the amount of swing depending upon the rate of deceleration and hence the effectiveness of the brakes.

Assuming that at a speed of 30 miles per hour with excellent brakes the pointer swings full scale, i. e. to "100" on row 92, the area adjacent this number is also marked "Excellent" and preceding areas are marked "Fair," "Good" and "Poor," for example.

It is apparent that a driver of the vehicle may readily determine its performance by merely starting the same rapidly or when traveling at a given speed of say 30 miles per hour by suddenly applying pressure on the brake pedal. In both cases, by reason of the relatively slow return of the pendulum to vertical position because of the baffle plates moving in the liquid filled container, the value indicated by the pointer may readily be viewed.

As many changes could be made in the above construction, and many apparently widely different embodiments of this invention could be made without departing from the scope of the claims, it is intended that all matter contained in the above description or shown in the accompanying drawing shall be interpreted as illustrative and not in a limiting sense.

Having thus described my invention, what I claim as new and desire to secure by Letters Patent of the United States is:

1. A vehicle performance meter comprising a liquid tight container, a pendulum pivotally mounted in said container for swinging movement, an indicating member, a shaft controlling said indicating member, a transmission from said pendulum to said shaft to rotate the latter upon movement of the pendulum, baffle means carried by said pendulum to inhibit the free swinging movement of the latter in said container when it is filled with liquid and baffle means mounted on said shaft to rotate therewith further to inhibit the free swinging movement of said pendulum.

2. A vehicle performance meter comprising a liquid tight container having a dial face over the mouth thereof, a shaft in said container extending through said dial face at right angles thereto, a pointer mounted on the extending end of said shaft, a pinion in said container affixed on said shaft near the other end thereof, a pendulum pivotally mounted in said container for swinging movement, an arcuate rack affixed to the lower end of said pendulum and engaging said pinion and baffle means carried respectively by said pendulum and said shaft to inhibit the free swinging movement of the pendulum in said container when it is filled with liquid.

3. A vehicle performance meter comprising a liquid tight container having a wall over the mouth thereof, a substantially U-shaped supporting bracket in said container affixed to the rear surface of said wall, a pendulum comprising a substantially U-shaped member having its legs pivotally connected to the legs of said supporting bracket for swinging movement adjacent said wall, a weight affixed to the cross piece of said U-shaped member, a shaft in said container extending through the cross piece of said U-shaped member and said wall at right angles thereto, a pointer mounted on the outwardly extending end of said shaft, a pinion in said container affixed on said shaft near the other end thereof, an arcuate rack affixed at one end to the cross piece of the U-shaped member and engaging said pinion, baffle plates carried by said pendulum and by said shaft respectively to inhibit the free swinging movement of the pendulum in said container when it is filled with liquid.

4. The combination set forth in claim 3 in which a resilient supporting member extends from said bracket substantially parallel to said shaft, the free end of said supporting member being bent to extend at right angles to said shaft and having an opening through which extends the end of said shaft near which the pinion is affixed.

5. The combination set forth in claim 3 in which a deformable bladder is positioned in said container and has a port in communication with the exterior of said container.

6. The combination set forth in claim 3 in which the associated pairs of legs of said bracket and said U-shaped member have aligned openings therethrough and the legs of the U-shaped member are pivotally mounted on the legs of said bracket by a U-shaped spring member having lateral legs extending through associated pairs of openings.

7. The combination set forth in claim 3 in which said wall forms the floor of a substantially cup-shaped member having a wall with an outwardly extending flange at the outer periphery thereof, a transparent disc is positioned over the floor of said cup-shaped member with its rim resting against said flange, said container having a wall of diameter to receive the wall of said cup-shaped member, said container wall having an outwardly extending flange against which rests the flange of said cup-shaped member, means securely to retain the rim of the disc and said flanges together and to provide a liquid tight seal, a case in which said container is positioned, said case having an inwardly extending flange at the mouth thereof and means securely to retain the rim of the disc and the flanges of the cup-shaped member and the container against the flange of said case.

8. The combination set forth in claim 7 in which a dial face is positioned against the outer surface of the floor of said cup-shaped member, said shaft extending through said dial face, and said floor and said dial face having aligned apertures for passage of fluid from the container into the space between the disc and the dial face.

9. The combination set forth in claim 7 in which the means securely to retain the rim of the disc and the flanges together and to provide a liquid tight seal comprises a rubber gasket encompassing said rims and said flanges and a plurality of arcuate channel members snugly encompassing said gasket and the rim of said disc and said flanges.

References Cited in the file of this patent

UNITED STATES PATENTS

| Number | Name | Date |
|---|---|---|
| 1,668,809 | James | May 8, 1928 |
| 2,484,730 | Perry | Oct. 11, 1949 |